United States Patent
Murakami et al.

(10) Patent No.: US 11,897,774 B2
(45) Date of Patent: Feb. 13, 2024

(54) METHOD FOR PRODUCING SILICA SOL HAVING ELONGATED PARTICLE SHAPE

(71) Applicant: NISSAN CHEMICAL CORPORATION, Tokyo (JP)

(72) Inventors: Satoru Murakami, Sodegaura (JP); Takuya Fukuoka, Sodegaura (JP); Kazuya Kuroiwa, Sodegaura (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 680 days.

(21) Appl. No.: 16/975,416

(22) PCT Filed: Feb. 25, 2019

(86) PCT No.: PCT/JP2019/007118
§ 371 (c)(1),
(2) Date: Aug. 25, 2020

(87) PCT Pub. No.: WO2019/163993
PCT Pub. Date: Aug. 29, 2019

(65) Prior Publication Data
US 2020/0407230 A1    Dec. 31, 2020

(30) Foreign Application Priority Data
Feb. 26, 2018    (JP) ................. 2018-032122

(51) Int. Cl.
*C01B 33/143*    (2006.01)
*C01B 33/145*    (2006.01)

(52) U.S. Cl.
CPC ........ *C01B 33/1435* (2013.01); *C01B 33/145* (2013.01); *C01P 2004/04* (2013.01); *C01P 2004/62* (2013.01); *C01P 2004/64* (2013.01)

(58) Field of Classification Search
None
See application file for complete search history.

(56) References Cited

U.S. PATENT DOCUMENTS

| 5,597,512 A | 1/1997 | Watanabe et al. |
| 9,783,702 B1 | 10/2017 | Guo et al. |

(Continued)

FOREIGN PATENT DOCUMENTS

| CN | 101397139 A | 4/2009 |
| JP | H01-317115 A | 12/1989 |

(Continued)

OTHER PUBLICATIONS

Mar. 26, 2019 International Search Report issued in International Patent Application No. PCT/JP2019/007118.

(Continued)

*Primary Examiner* — Colin W. Slifka
*Assistant Examiner* — Michael Forrest
(74) *Attorney, Agent, or Firm* — Oliff PLC

(57) ABSTRACT

A method for producing a silica sol containing a small amount of metal impurities and in which colloidal silica having an elongated particle shape dispersed in a solvent, includes: preparing a raw material liquid by adding a compound as an anion source selected from inorganic acids, organic acids, and their ammonium salts, and ammonia to a colloidal aqueous solution of activated silica having an $SiO_2$ concentration of 1 to 6% by mass and a pH of 2 to 5 so that the mass ratio of the compound to $SiO_2$ is 3.0 to 7.0%; and heating the raw material liquid at 80 to 200° C. for 0.5 to 20 hours. The elongated colloidal silica particles exhibit a $D_L/D_B$ ratio of 2.5 or more. $D_L$ is an average particle diameter as measured by the dynamic light scattering method. $D_B$ is a primary particle diameter as measured by the nitrogen gas adsorption method.

19 Claims, 4 Drawing Sheets

(56) References Cited

U.S. PATENT DOCUMENTS

2010/0037801 A1* 2/2010 Ohmori ............... C01B 33/1465
                                                      106/482
2016/0130152 A1   5/2016 Yoshitake et al.

FOREIGN PATENT DOCUMENTS

| JP | H04-187512 A   | 7/1992  |
|----|----------------|---------|
| JP | H07-118008 A   | 5/1995  |
| JP | 2004-189534 A  | 7/2004  |
| JP | 2007-153672 A  | 6/2007  |
| JP | 2010-143784 A  | 7/2010  |
| JP | 2011-098859 A  | 5/2011  |
| TW | 200833606 A    | 8/2008  |
| TW | 200940449 A    | 10/2009 |
| TW | 201509808 A    | 3/2015  |
| WO | 2008/093422 A1 | 8/2008  |

OTHER PUBLICATIONS

Mar. 26, 2019 Written Opinion issued in International Patent Application No. PCT/JP2019/007118.
Jul. 13, 2022 Office Action issued in Taiwanese Patent Application No. 108106391.
Aug. 23, 2023 Office Action issued in Chinese Patent Application No. 201980015451.3.

* cited by examiner

METHOD FOR PRODUCING SILICA SOL HAVING ELONGATED PARTICLE SHAPE

TECHNICAL FIELD

The present invention relates to a method for producing a silica sol wherein elongated colloidal silica particles are dispersed in a liquid medium. In particular, the present invention relates to a method for efficiently producing a silica sol containing a small amount of an alkali metal or an alkaline earth metal.

BACKGROUND ART

The shape of colloidal silica particles is roughly divided into two types; i.e., a nearly spherical shape and a non-spherical shape. Non-spherical silica particles are expected to exhibit various effects (e.g., bonding force, adsorption force, and optical transparency) through control of the shape of the particles, and are used in a variety of applications including microfillers for various coating agents, binders, modifiers, catalyst carriers, and abrasives for electronic materials (e.g., an abrasive for a silicon wafer, and a CMP abrasive for a device wafer for polishing a silicon oxide film or a metal such as copper or aluminum).

Elongated silica particles composed of nearly spherical silica particles connected in a chain or rosary form are also categorized as non-spherical silica particles. There exists a silica sol wherein such non-spherical silica particles are stably dispersed in an aqueous medium or an organic medium.

For example, there has been disclosed a method for producing a silica sol wherein colloidal silica particles having an elongated shape are dispersed in a liquid medium, the method involving addition of an aqueous solution containing a water-soluble calcium salt, a magnesium salt, or a mixture of these salts to a colloidal aqueous solution of activated silica having an $SiO_2$ concentration of 1 to 6% by mass so that the mass ratio of CaO (calcium oxide), MgO (magnesium oxide), or both of them to $SiO_2$ (silica) of the activate silica is 1,500 to 8,500 ppm; further addition of an alkali metal hydroxide, an organic base, or a water-soluble silicate of any of these so as to achieve a ratio by mole of 20 to 300 calculated by the formula $SiO_2/M_2O$ (wherein $SiO_2$ corresponds to the total of the amount of silica derived from the activated silica and the amount of silica derived from the water-soluble silicate, and M corresponds to the alkali metal atom or the organic base molecule); and then heating of the resultant mixture at 60 to 300° C. for 0.5 to 40 hours (see Patent Document 1).

There has been disclosed a silica sol containing silica particles connected in a chain form, wherein the relationship between reduced viscosity and silica concentration is represented by a specific function. The disclosed production method for the silica sol involves addition of polyvalent metal ions of, for example, Ca, Mg, Al, In, Ti, Zr, Sn, Si, Sb, Fe, Cu, or a rare earth metal to an aqueous alkali metal silicate solution before addition of silicic acid thereto; heating of the resultant mixture at a temperature of 60° C. or higher; and addition of silicic acid again (see Patent Document 2).

There has been disclosed colloidal silica which is produced from activated silica as a raw material in the presence of potassium ions, and which contains potassium ions and a group of non-spherical, deformed silica particles having a major axis length/minor axis length ratio of 1.2 to 10 as determined by observation with a transmission electron microscope. The disclosed production method for the colloidal silica involves addition of a compound as a potassium ion source and an alkaline agent to an aqueous activated silica solution so that the resultant mixture exhibits alkalinity; heating of the mixture to form silica particles; and addition of an aqueous activated silica solution, an alkaline agent, and a compound as a potassium ion source under heating (see Patent Document 3).

PRIOR ART DOCUMENTS

Patent Documents

Patent Document 1: Japanese Unexamined Patent Application Publication No. 1989-317115 (JP 1989-317115 A)
Patent Document 2: Japanese Unexamined Patent Application Publication No. 1992-187512 (JP 1992-187512 A)
Patent Document 3: Japanese Unexamined Patent Application Publication No. 2011-098859 (JP 2011-098859 A)

SUMMARY OF THE INVENTION

Problems to be Solved by the Invention

Metal impurities contained in a silica sol may make the silica sol unusable in some applications. An object of the present invention is to provide a method for producing a silica sol which contains a small amount of metal impurities and in which non-spherical silica is dispersed in a solvent. According to the present invention, a silica sol which contains a small amount of metal impurities and in which colloidal silica having an elongated particle shape is dispersed in a solvent can be readily produced by addition of a compound as an anion source and ammonia as an alkali source to an aqueous activated silica solution and heating of the resultant mixture at a predetermined temperature.

Means for Solving the Problems

A first aspect of the present invention is a method for producing a silica sol containing elongated colloidal silica particles dispersed in a liquid medium and having an $SiO_2$ concentration of 6 to 30% by mass, wherein the elongated colloidal silica particles have a particle length of 50 to 1,000 nm as determined by observation with an electron microscope and exhibit a $D_L/D_B$ ratio of 2.5 or more and a $D_L$ of 30 to 300 nm wherein $D_L$ is an average particle diameter (nm) as measured by the dynamic light scattering method, and $D_B$ is a primary particle diameter (nm) as measured by the nitrogen gas adsorption method, the production method comprising the following steps (a) and (b):

(a) a step of preparing a raw material liquid by adding at least one compound as an anion source selected from the group consisting of inorganic acids, organic acids, and ammonium salts of these acids, and ammonia to a colloidal aqueous solution of activated silica having an $SiO_2$ concentration of 1 to 6% by mass and a pH of 2 to 5 so that the mass ratio of the compound to $SiO_2$ is 3.0 to 7.0%; and (b) a step of heating the raw material liquid prepared in the step (a) at 80 to 200° C. for 0.5 to 20 hours, to thereby produce a silica sol.

A second aspect of the present invention is the method for producing a silica sol according to the first aspect, wherein the colloidal aqueous solution of activated silica used in the step (a) is prepared by bringing an aqueous alkali silicate solution exhibiting a ratio by mole of $SiO_2/M_2O$ (wherein M is sodium or potassium) of 1 to 4.5 into contact with a strong acid-type cation exchange resin or with both a strong acid-type cation exchange resin and a strong base-type anion exchange resin.

A third aspect of the present invention is the method for producing a silica sol according to the second aspect, wherein the colloidal aqueous solution of activated silica used in the step (a) is prepared by treating the aqueous alkali silicate solution with a strong acid at a temperature of 1 to 98° C., and then bringing the treated aqueous solution into contact with a strong acid-type cation exchange resin or with both a strong acid-type cation exchange resin and a strong base-type anion exchange resin.

A fourth aspect of the present invention is the method for producing a silica sol according to the second or third aspect, wherein the colloidal aqueous solution of activated silica used in the step (a) is prepared by bringing the aqueous alkali solution or the treated aqueous solution into contact with a carboxylic acid-type chelating resin, a hydroxyl group-type chelating resin, and/or an amine-type chelating resin before or after contact with a strong acid-type cation exchange resin or with both a strong acid-type cation exchange resin and a strong base-type anion exchange resin.

A fifth aspect of the present invention is the method for producing a silica sol according to any one of the first to fourth aspects, wherein the compound as an anion source used in the step (a) is at least one compound as an anion source selected from the group consisting of nitric acid, sulfuric acid, phosphoric acid, boric acid, hydrofluoric acid, hydrochloric acid, acetic acid, formic acid, oxalic acid, citric acid, lactic acid, malic acid, gluconic acid, tartaric acid, ethylenediaminetetraacetic acid (EDTA), diethylenetriaminepentaacetic acid (DTPA), and an ammonium salt of any of these.

A sixth aspect of the present invention is the method for producing a silica sol according to any one of the first to fifth aspects, wherein the colloidal aqueous solution of activated silica used in the step (a) contains colloidal particles having an average particle diameter of less than 5 nm.

A seventh aspect of the present invention is the method for producing a silica sol according to any one of the first to sixth aspects, wherein the ammonia added in the step (a) is in the form of ammonia gas or an aqueous ammonia solution.

An eighth aspect of the present invention is the method for producing a silica sol according to any one of the first to seventh aspects, wherein the step (a) comprises a step of adding the compound as an anion source to the colloidal aqueous solution of activated silica, followed by addition of the ammonia.

A ninth aspect of the present invention is the method for producing a silica sol according to any one of the first to seventh aspects, wherein the step (a) comprises a step of adding the ammonia to the colloidal aqueous solution of activated silica, followed by addition of the compound as an anion source and subsequent addition of the ammonia.

A tenth aspect of the present invention is the method for producing a silica sol according to any one of the first to ninth aspects, wherein the raw material liquid prepared in the step (a) has a pH of 8 to 12.

An eleventh aspect of the present invention is the method for producing a silica sol according to any one of the first to tenth aspects, wherein, in the step (b), the raw material liquid is heated in an autoclave apparatus at 100° C. to 180° C.

A twelfth aspect of the present invention is the method for producing a silica sol according to any one of the first to eleventh aspects, wherein the method further comprises a step of bringing the silica sol produced in the step (b) into contact with a strongly acidic ion exchange resin and/or a strongly basic ion exchange resin.

A thirteenth aspect of the present invention is the method for producing a silica sol according to the twelfth aspect, wherein the method further comprises a step of bringing the silica sol produced in the step (b) into contact with a carboxylic acid-type chelating resin, a hydroxyl group-type chelating resin, and/or an amine-type chelating resin before or after contact with a strongly acidic ion exchange resin and/or a strongly basic ion exchange resin.

A fourteenth aspect of the present invention is the method for producing a silica sol according to any one of the first to thirteenth aspects, wherein the method further comprises a step of replacing the aqueous medium of the produced silica sol with an organic medium.

A fifteenth aspect of the present invention is the method for producing a silica sol according to any one of the first to fourteenth aspects, wherein the mass ratio of each of Ca and Mg to $SiO_2$ is 2 to 100 ppm in the silica sol.

A sixteenth aspect of the present invention is the method for producing a silica sol according to any one of the first to fifteenth aspects, wherein the mass ratio of Na to $SiO_2$ is 2 to 1,000 ppm, and the mass ratio of K to $SiO_2$ is 2 to 100 ppm in the silica sol.

A seventeenth aspect of the present invention is the method for producing a silica sol according to any one of the first to sixteenth aspects, wherein the elongated colloidal silica particles exhibit a $D_L/D_B$ ratio of 3 to 30 wherein $D_L$ is an average particle diameter (nm) as measured by the dynamic light scattering method, and $D_B$ is a primary particle diameter (nm) as measured by the nitrogen gas adsorption method.

An eighteenth aspect of the present invention is the method for producing a silica sol according to any one of the first to seventeenth aspects, wherein the silica sol is an acidic silica sol or an ammonia-containing alkaline silica sol.

Effects of the Invention

The present invention can produce a silica sol of high purity containing a small amount of metal impurities and composed of dispersed elongated colloidal silica particles through the following procedure: an aqueous alkali metal silicate solution is brought into contact with a cation exchange resin or with both a cation exchange resin and an anion exchange resin, to thereby produce activated silica; the activated silica is mixed with at least one compound as an anion source selected from the group consisting of inorganic acids, organic acids, and ammonium salts of these acids, and ammonia as an alkali source, to thereby prepare activated silica (raw material liquid); and the raw material liquid is heated (preferably treated with an autoclave).

A silica sol containing dispersed non-spherical silica particles is expected to exhibit various effects (e.g., bonding force, adsorption force, and optical transparency) depending on the shape of the particles. Thus, the silica sol is used in a variety of applications including microfillers for various coating agents, binders, modifiers, catalyst carriers, and abrasives for electronic materials (e.g., an abrasive for a silicon wafer, and a CMP abrasive for a device wafer for polishing a silicon oxide film or a metal such as copper or aluminum).

Some of these applications impose a severe restriction on the amount of metal impurities contained in a silica sol. The silica sol produced by the method of the present invention can be used in such applications, since the silica sol contains a small amount of metal impurities (i.e., achieves an increase in purity).

The aforementioned increase in purity is based on the fact that the present invention uses ammonia as an alkali source, rather than an alkali metal such as Na or K.

An increase in purity may be achieved in the step (a) of preparing activated silica, or the step (b) of forming the silica sol, or both of these steps.

For an increase in purity, metal impurities can be removed from the colloidal aqueous solution of activated silica and the silica sol by bringing the colloidal aqueous solution of activated silica used in the step (a) or the silica sol prepared in the step (b) into contact with a strong acid-type cation exchange resin and/or a strong base-type anion exchange resin and with a weak acid-type (carboxylic acid-type) chelating resin and/or a weak base-type (amine-type) chelating resin.

The colloidal aqueous solution of activated silica used in the step (a) is treated with a strong acid at room temperature or under heating, to thereby elute (leach) metal impurities trapped in the colloid of activated silica into the aqueous solution, and the treated aqueous solution is brought into contact with a strong acid-type cation exchange resin or a strong base-type anion exchange resin and with a weak acid-type (carboxylic acid-type) chelating resin or a weak base-type (amine-type) chelating resin, to thereby remove the eluate. Thus, an increase in purity can be achieved.

The aforementioned metal impurities are, for example, Na, K, Ca, Mg, Ni, Cu, Fe, Co, Zn, and Ti. Since ammonia is used as an alkali source in the present invention, the amounts of Na and K contained in a silica sol can be reduced. The production method provided by the present invention can produce a silica sol containing small amounts of Ca and Mg, since the method does not use Ca and Mg sources for causing silica particles to have an elongated shape. Polyvalent metals can be removed from the silica sol by using an ion exchange resin and a chelating resin in combination.

BRIEF DESCRIPTION OF THE DRAWINGS

FIG. 1 is a TEM (transmission electron microscope) photograph (magnification: 250,000) of elongated colloidal silica particles prepared in Example 1.

FIG. 2 is a TEM (transmission electron microscope) photograph (magnification: 250,000) of elongated colloidal silica particles prepared in Example 2.

FIG. 3 is a TEM (transmission electron microscope) photograph (magnification: 250,000) of elongated colloidal silica particles prepared in Example 3.

FIG. 4 is a TEM (transmission electron microscope) photograph (magnification: 250,000) of elongated colloidal silica particles prepared in Example 4.

FIG. 5 is a TEM (transmission electron microscope) photograph (magnification: 250,000) of elongated colloidal silica particles prepared in Example 5.

FIG. 6 is a TEM (transmission electron microscope) photograph (magnification: 250,000) of elongated colloidal silica particles prepared in Comparative Example 1.

FIG. 7 illustrates a method for determining the particle length (L) of elongated colloidal silica particles from a TEM (transmission electron microscope) photograph.

MODES FOR CARRYING OUT THE INVENTION

Figure 1:
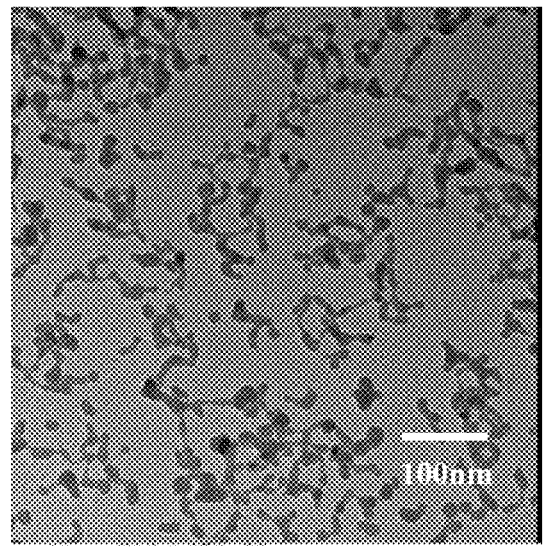
[FIG. 1]
Figure 2:
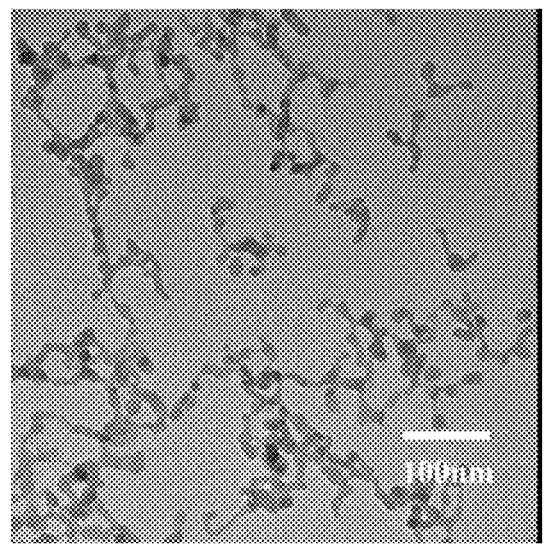
[FIG. 2]
Figure 3:
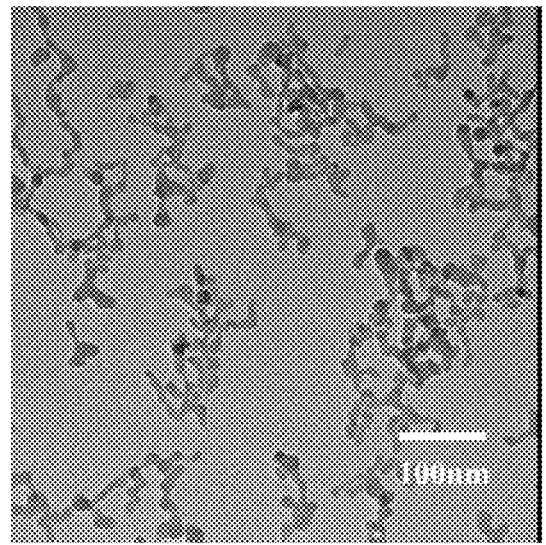
[FIG. 3]
Figure 4:
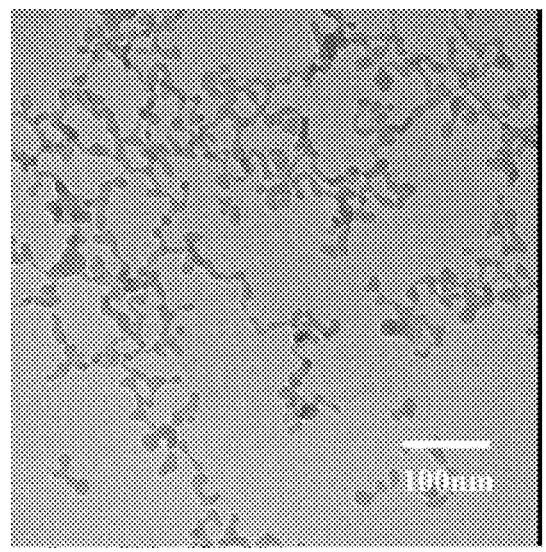
[FIG. 4]
Figure 5:
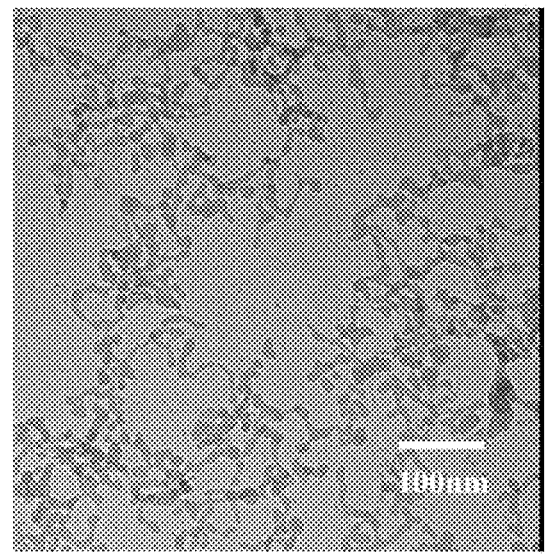
[FIG. 5]
Figure 6:
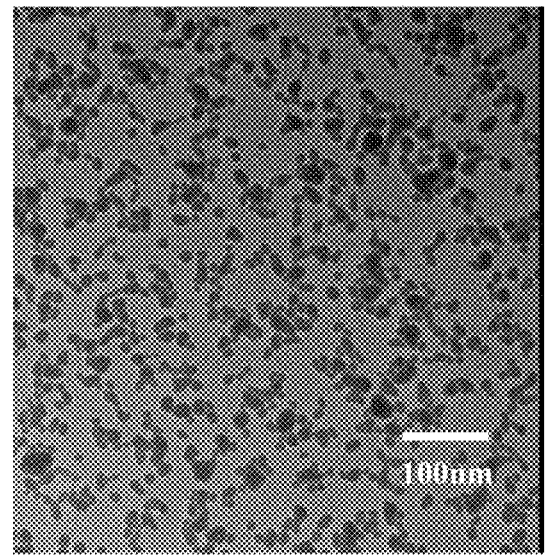
[FIG. 6]

The present invention is directed to a method for producing a silica sol containing elongated colloidal silica particles dispersed in a liquid medium and having an $SiO_2$ concentration of 6 to 30% by mass, wherein the elongated colloidal silica particles have a particle length of 50 to 1,000 nm as determined by observation with an electron microscope and exhibit a $D_L/D_B$ ratio of 2.5 or more and a $D_L$ of 30 to 300 nm wherein $D_L$ is an average particle diameter (nm) as measured by the dynamic light scattering method, and $D_B$ is a primary particle diameter (nm) as measured by the nitrogen gas adsorption method, the production method comprising the following steps (a) and (b):

(a) a step of preparing a raw material liquid by adding at least one compound as an anion source selected from the group consisting of inorganic acids, organic acids, and ammonium salts of these acids, and ammonia to a colloidal aqueous solution of activated silica having an $SiO_2$ concentration of 1 to 6% by mass and a pH of 2 to 5 so that the mass ratio of the compound to $SiO_2$ is 3.0 to 7.0%; and (b) a step of heating the raw material liquid prepared in the step (a) at 80 to 200° C. for 0.5 to 20 hours, to thereby produce a silica sol.

The aforementioned liquid medium is an aqueous medium (water) or an organic medium (organic solvent).

The principle of measurement of the average particle diameter $D_L$ (nm) is based on the dynamic light scattering method. For example, the average particle diameter can be measured with a dynamic light scattering particle diameter measuring apparatus (trade name: Zetasizer Nano, available from Spectris Co., Ltd.). The average particle diameter $D_L$ (nm) measured by the dynamic light scattering method falls within a range of 30 to 300 nm.

The primary particle diameter $D_B$ (nm) is calculated from the following formula: ($D_B$ nm)=2720/S wherein S is a specific surface area ($m^2/g$) measured by the nitrogen gas adsorption method (BET method). The primary particle diameter refers to the diameter of a virtual spherical silica particle having a specific surface area equal to that of an elongated colloidal silica particle. Thus, the $D_L/D_B$ ratio probably corresponds to the degree of elongation of an elongated silica particle. An elongated colloidal silica particle neither has a three-dimensional aggregation structure formed of particles, nor has a three-dimensional network structure. An elongated colloidal silica particle has a structure in which particles are connected in a rosary form and/or a chain form. Conceivably, silica particles having the same particle diameter and/or different particle diameters are connected in a rosary form and/or a chain form.

The "degree of elongation of a silica particle" as used herein refers to the degree of connection (length) of colloidal silica particles connected in a rosary form and/or a chain form.

In the present invention, the $D_L/D_B$ ratio is 2.5 or more and may be, for example, 2.5 to 50.0, or 3.0 to 30.0, or 3.0 to 15.0.

In the present invention, the elongated colloidal silica particles may be either of crystalline particles and amorphous particles, or may be a mixture of crystalline and amorphous particles. Elongated amorphous colloidal silica particles are preferred.

The particle length of the colloidal silica particles can be determined by observation of the particle shape with an electron microscope (transmission electron microscope). The particle length is 50 to 1,000 nm or 60 to 800 nm.

Figure 7:
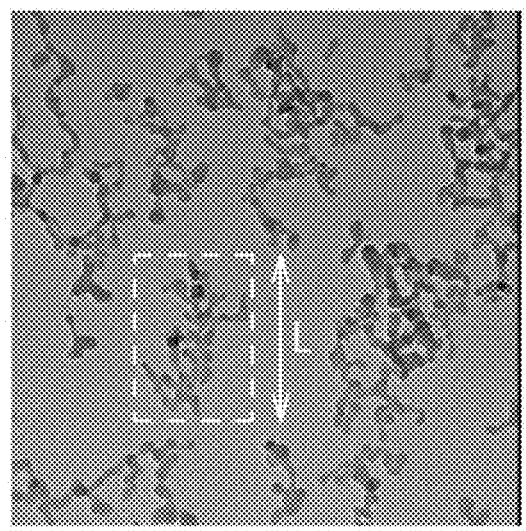
[FIG. 7]

The particle length of elongated colloidal silica particles as used herein is determined as follows. Specifically, as shown in FIG. 7, colloidal silica particles connected in a rosary form and/or a chain form are regarded as a single silica particle, and the particle is projected onto a plane, followed by measurement of the length (L) of the long side of a rectangle circumscribing the projected image and having the smallest area. The length (L) corresponds to the particle length.

The colloidal aqueous solution of activated silica used in the step (a) can be prepared by bringing an aqueous alkali silicate solution exhibiting a ratio by mole of $SiO_2/M_2O$ (wherein M is sodium or potassium) of 1 to 4.5 into contact with an ion exchange resin, for example, a strong acid-type cation exchange resin, or both a strong acid-type cation exchange resin and a strong base-type anion exchange resin. No particular limitation is imposed on the method for bringing the aqueous alkali silicate solution into contact with the ion exchange resin. For example, the aqueous alkali silicate solution is passed through a column filled with the ion exchange resin so that the aqueous alkali silicate solution comes into contact with the ion exchange resin.

The colloidal aqueous solution of activated silica can be produced by preparing the aforementioned aqueous alkali silicate solution so as to have a solid content of 1 to 10% by mass, and then bringing the aqueous alkali silicate solution into contact with the ion exchange resin. The "solid content" as used herein corresponds to the total amount of all components of the aqueous solution or the silica sol, except for the amount of the aqueous medium or organic medium component. The aqueous alkali silicate solution may be prepared by dilution of commercially available sodium silicate No. 1, No. 2, or No. 3 with, for example, pure water.

The strong acid-type cation exchange resin is a hydrogen-type cation exchange resin, and the hydrogen-type cation exchange resin may be prepared by passing an aqueous strong acid solution through a column filled with a cation exchange resin. Examples of the strong acid-type cation exchange resin include Amberlite (trade name) IR-120B, Amberjet 1020, and DOWEX MARATHON GH available from The Dow Chemical Company; Diaion (trade name) SK104 and Diaion PK208 available from Mitsubishi Chemical Holdings Corporation; and Duolite (trade name) C20J available from Sumika Chemtex Company, Limited.

The strong base-type anion exchange resin is a hydroxyl group-type anion exchange resin, and the hydroxyl group-type anion exchange resin may be prepared by passing an aqueous strong alkali solution through a column filled with an anion exchange resin. Examples of the strong base-type anion exchange resin include Amberlite (trade name) IRA400J, Amberlite IRA410J, and Amberjet 4400 available from The Dow Chemical Company; Diaion (trade name) SA10A and Diaion SA20A available from Mitsubishi Chemical Holdings Corporation; and Duolite (trade name) UBA120 available from Sumika Chemtex Company, Limited.

The aforementioned colloidal aqueous solution of activated silica used may have an $SiO_2$ solid content of 1 to 10% by mass, preferably 1 to 6% by mass.

The colloidal aqueous solution of activated silica used in the step (a) may be further brought into contact with a carboxylic acid-type chelating resin, a hydroxyl group-type chelating resin, and/or an amine-type chelating resin.

Such a chelating resin contains two or more electron-donating atoms such as N, S, O, and P. Examples of such a chelating resin include N—O type, S—N type, N—N type, and O—O type chelating resins; for example, iminodiacetic acid-type ($-N(CH_2COO-)_2$) and polyamine-type ($-NH(CH_2CH_2NH)nH$) chelating resins. Specific examples include Diaion (trade name) CR11, Diaion CR20, Diaion CRB03, and Diaion CRB05 available from Mitsubishi Chemical Corporation. Adsorbed metal ions can be recycled by using an aqueous mineral acid solution (aqueous hydrochloric acid solution or aqueous sulfuric acid solution). A chelating resin containing adsorbed metal ions can be recycled by removing the metal ions with an aqueous mineral acid solution (aqueous hydrochloric acid solution or aqueous sulfuric acid solution).

The purity of the colloidal aqueous solution of activated silica used in the step (a) can be further increased by repeatedly passing the solution through a column charged (filled) with the aforementioned ion exchange resin or chelating resin.

The column can be charged (filled) with the aforementioned ion exchange resin or chelating resin, and the aforementioned aqueous solution can be passed through the column at a space velocity of 1 to 30 $h^{-1}$ or 1 to 15 $h^{-1}$.

The purity of the colloidal aqueous solution of activated silica used in the step (a) can be further increased by treating the solution with a strong acid at a temperature of 1 to 98° C., and then bringing the treated solution into contact with a strong acid-type cation exchange resin or with both a strong acid-type cation exchange resin and a strong base-type anion exchange resin. The colloidal aqueous solution of activated silica is probably in the form of an aqueous solution of colloidal silica fine particles (e.g., a particle diameter of 5 nm or less, or less than 5 nm, or 3 nm or less, or 1 nm or less). In some cases, such colloidal particles may contain metal impurities. When the metal impurities contained in the colloidal particles cannot be removed with the ion exchange resin or the chelating resin, the colloidal aqueous solution of activated silica can be treated with an aqueous acid solution at 1 to 98° C., preferably at room temperature, to thereby elute the metal impurities from the interior of the colloidal particles into the aqueous solution. The metal impurities are separated (through adsorption) from the aqueous solution by bringing the solution into contact with the aforementioned ion exchange resin or chelating resin. Thus, the purity of the colloidal aqueous solution of activated silica can be increased, to thereby increase the purity of the finally produced silica sol.

The compound as an anion source used in the step (a) may be at least one compound as an anion source selected from the group consisting of nitric acid, sulfuric acid, phosphoric acid, boric acid, hydrofluoric acid, hydrochloric acid, acetic acid, formic acid, oxalic acid, citric acid, lactic acid, malic acid, gluconic acid, tartaric acid, ethylenediaminetetraacetic acid (EDTA), diethylenetriaminepentaacetic acid (DTPA), and an ammonium salt of any of these. For example, an aqueous solution of, for example, nitric acid, sulfuric acid, or oxalic acid may be used. Such an anion source may be added in the form of an ammonium salt, or may be used as an ammonium salt converted by ammonia used for pH adjustment. The concentration of the aqueous solution used may be, for example, 0.1 to 50% by mass, or 0.1 to 10% by mass, or 0.1 to 5% by mass, or 0.1 to 1% by mass, or 0.1 to 0.2% by mass.

The ammonia used in the step (a) for pH adjustment may be in the form of ammonia gas or an aqueous ammonia solution. For example, ammonia gas is introduced directly into the colloidal aqueous solution of activated silica for pH adjustment, or an aqueous ammonia solution is added to the colloidal aqueous solution of activated silica for pH adjustment. The aqueous ammonia solution may be used at a concentration of 28% by mass, or may be used after being diluted with pure water to a concentration of 1 to less than 28% by mass.

The step (a) includes, for example, a step of adding the aforementioned compound as an anion source to the aforementioned colloidal aqueous solution of activated silica, followed by addition of the aforementioned ammonia.

The step (a) includes, for example, a step of adding the aforementioned ammonia to the aforementioned colloidal aqueous solution of activated silica, followed by addition of the aforementioned compound as an anion source and subsequent addition of the aforementioned ammonia.

The pH of the raw material liquid (colloidal aqueous solution of activated silica) prepared in the step (a) may be adjusted to 8 to 12, or 9 to 11, or 9 to 10.

The step (b) involves heating of the raw material liquid (colloidal aqueous solution of activated silica) prepared in the step (a) at 80 to 200° C., or 100 to 180° C., or 120 to 150° C. with stirring for 0.5 to 20 hours, to thereby produce a silica sol. The heating of the raw material liquid with an autoclave apparatus at a temperature of 100 to 200° C. or 100 to 180° C. can produce a silica sol containing dispersed elongated colloidal silica particles having a high degree of deformation. An ammonia-containing alkaline silica sol having a pH of 8 to 11 or 9 to 11 is produced through the step (b).

The silica sol produced in the step (b) may be optionally subjected to concentration with an ultrafiltration membrane, or evaporative concentration under reduced pressure or at ambient pressure, so as to adjust the concentration of $SiO_2$ to 6 to 30% by mass.

The silica sol produced in the step (b) can be brought into contact with a strongly acidic ion exchange resin and/or a strongly basic ion exchange resin, to thereby prepare a silica sol of high purity. For example, the silica sol produced in the step (b) can be brought into contact with a strongly acidic ion exchange resin, or with both a strongly acidic ion exchange resin and a strongly basic ion exchange resin, to thereby prepare a silica sol of high purity.

The silica sol produced in the step (b) can be brought into contact with a carboxylic acid-type chelating resin, a hydroxyl group-type chelating resin, and/or an amine-type chelating resin before or after contact with a strongly acidic ion exchange resin and/or a strongly basic ion exchange resin, to thereby prepare a silica sol of high purity. For example, the silica sol produced in the step (b) can be brought into contact with a carboxylic acid-type chelating resin, a hydroxyl group-type chelating resin, and/or an amine-type chelating resin after contact with a strongly acidic ion exchange resin or with both a strongly acidic ion exchange resin and a strongly basic ion exchange resin, to thereby prepare a silica sol of high purity.

The silica sol produced in the step (b) can be brought into contact with a strongly acidic ion exchange resin, to thereby produce an acidic silica sol.

The aqueous medium of the aforementioned acidic silica sol can be replaced with an organic medium (organic solvent), to thereby produce an organosilica sol. This solvent replacement can be performed by evaporation with an apparatus such as a rotary evaporator. The solvent replacement does not cause a change in the $D_L/D_B$ ratio of elongated colloidal silica particles.

Examples of usable organic solvents include alcohols, glycols, esters, ketones, nitrogen-containing solvents, and aromatic solvents. Specific examples of such solvents include organic solvents, such as methanol, ethanol, propanol, ethylene glycol, propylene glycol, glycerin, ethylene glycol monomethyl ether, propylene glycol monomethyl ether, propylene glycol monomethyl ether acetate, propylene glycol monoethyl ether, propylene glycol monoethyl ether acetate, acetone, methyl ethyl ketone, dimethylformamide, N-methyl-2-pyrrolidone, toluene, xylene, and dimethylethane. Other examples of usable solvents include polyethylene glycol, silicone oil, and reactive diluents containing radical-polymerizable vinyl and epoxy groups.

The surfaces of elongated colloidal silica particles may be treated with a silane coupling agent such as tetraethoxysilane, trimethylmonoethoxysilane, or hexamethyldisilane.

The resultant silica sol may contain Ca and Mg as metal impurities, wherein the mass ratio of Ca to $SiO_2$ is 2 to 100 ppm or 2 to 50 ppm, and the mass ratio of Mg to $SiO_2$ is 2 to 100 ppm or 2 to 50 ppm.

The silica sol may also contain Na and K, wherein the mass ratio of Na to $SiO_2$ is 2 to 1,000 ppm or 2 to 500 ppm, and the mass ratio of K to $SiO_2$ is 2 to 100 ppm or 2 to 50 ppm.

The silica sol produced in the step (b) can be brought into contact with a strongly acidic ion exchange resin, to thereby prepare an acidic silica sol, and then high-purity ammonia gas or aqueous ammonia solution can be added to the acidic silica sol, to thereby prepare an ammonia-containing alkaline silica sol.

EXAMPLES

[Evaluation of Physical Properties of Silica Sol]
1) pH
The pH was measured with a pH meter (available from DKK-TOA CORPORATION).

2) Electrical conductivity
The electrical conductivity was measured with an electrical conductivity meter (available from DKK-TOA CORPORATION).

3) $SiO_2$ concentration
The mass of $SiO_2$ was determined from the difference between the mass of a residue obtained by baking of the silica sol at 1,000° C. and the mass of metal elements (in terms of oxide) contained in the silica sol in an amount of 1 ppm or more among all metal elements measured by the metal element analysis as described in 7) below. The $SiO_2$ concentration was calculated on the basis of the determined mass of $SiO_2$.

4) $D_L$ particle diameter (average particle diameter as measured by the dynamic light scattering method)
The $D_L$ particle diameter was measured with a dynamic light scattering particle diameter measuring apparatus (Zetasizer Nano, available from Spectris Co., Ltd.).

5) $D_B$ particle diameter (primary particle diameter as measured by the nitrogen gas adsorption method) p An aqueous silica sol was brought into contact with a hydrogen-type strongly acidic cation exchange resin, to thereby remove sodium adsorbed on the surface of the silica sol. Thereafter, the silica sol was dried at 300° C. and then ground to prepare a powder sample. The specific surface area S ($m^2/g$) of the resultant powder sample was measured by the BET method with a nitrogen adsorption specific surface area measuring apparatus (Monosorb MS-16, available from Yuasa Ionics Co., Ltd.), to thereby determine the $D_B$ particle diameter (nm).

The $D_B$ particle diameter was calculated by the following formula (II) (through conversion of colloidal silica particles into spherical particles).

$$D_B \text{ (nm)} = 2720/S \text{ (m}^2\text{/g)} \tag{II}$$

6) Electron microscopic observation

The particles were photographed with a transmission electron microscope (JEM-1010, available from JEOL Ltd.) at an acceleration voltage of 100 kV.

The resultant TEM (transmission electron microscope) photograph was used to determine the particle length of elongated colloidal silica particles (average of 50 randomly selected particles). Specifically, as shown in FIG. 7, elongated colloidal silica particles connected in a rosary form and/or a chain form were regarded as a single silica particle, and the particle was projected onto a plane, followed by measurement of the length (L) of the long side of a rectangle circumscribing the projected image and having the smallest area. The length (L) was regarded as the particle length.

7) Metal element analysis

The metal element analysis was performed with an atomic absorption spectrophotometer (Spectra AA, available from Agilent Technologies, Inc.) and an ICP emission spectrophotometer (CIROS120 EOP, available from Rigaku Corporation).

The amounts of measured metals (Si, Na, K, Mg, and Ca) were used to calculate the mass ratio of the metals to $SiO_2$ whose amount was determined as described above in 3) $SiO_2$ concentration.

[Determination of Deformation]

◯: $D_L$ particle diameter/$D_B$ particle diameter=2.5 or more

Determination of growth of elongated silica particles by observation with a transmission electron microscope.

X: $D_L$ particle diameter/$D_B$ particle diameter=less than 2.5

Insufficient growth of elongated silica particles.

Gelation: "Gelation" refers to formation of a gel.

Example 1

Water was added to commercially available sodium water glass (JIS No. 3 sodium water glass: $SiO_2$ concentration: 28.8% by mass, $Na_2O$ concentration: 9.47% by mass, ratio by mole of $SiO_2/Na_2O$: 3.1 to 3.3), to thereby prepare an aqueous sodium silicate solution having an $SiO_2$ concentration of 3.8% by mass. The aqueous sodium silicate solution was passed through a column filled with a hydrogen-type strongly acidic cation exchange resin (Amberlite IR-120B, available from The Dow Chemical Company), to thereby prepare a colloidal aqueous solution of activated silica having an $SiO_2$ concentration of 3.4% by mass and a pH of 2.9.

A stirring bar was added to a 500-ml styrol bottle, and 351.3 g of the above-prepared activated silica was added thereto. While the activated silica was stirred with a magnetic stirrer, 5.2 g of 10% by mass aqueous nitric acid solution (serving as an anion source) was added, and then 4.8 g of 28% aqueous ammonia solution was added. Thereafter, 8.7 g of pure water was added, and the resultant mixture was stirred for one hour, to thereby prepare a raw material liquid having an $SiO_2$ concentration of 3.2%.

A SUS autoclave (inner volume: 300 ml) was charged with 260 g of the raw material liquid, and the raw material liquid was heated at 140° C. for eight hours and then cooled to room temperature. Thereafter, the resultant silica sol was removed from the autoclave. The silica sol was evaluated according to the aforementioned "evaluation of physical properties of silica sol" and "determination of deformation."

Example 2

A raw material liquid of Example 2 was produced in the same manner as in Example 1, except that the amount of 10% by mass aqueous nitric acid solution was changed to 8.1 g, the amount of 28% by mass aqueous ammonia solution was changed to 5.9 g, and the amount of pure water was changed to 4.7 g.

A SUS autoclave (inner volume: 300 ml) was charged with 260 g of the raw material liquid, and the raw material liquid was heated at 140° C. for eight hours and then cooled to room temperature. Thereafter, the resultant silica sol was removed from the autoclave. The silica sol was evaluated according to the aforementioned "evaluation of physical properties of silica sol" and "determination of deformation."

Example 3

A raw material liquid of Example 3 was produced in the same manner as in Example 1, except that 10% by mass nitric acid serving as an anion source was changed to 0.5 g of oxalic acid dihydrate, the amount of 28% by mass aqueous ammonia solution was changed to 4.1 g, and the amount of pure water was changed to 14.0 g.

A SUS autoclave (inner volume: 300 ml) was charged with 260 g of the raw material liquid, and the raw material liquid was heated at 140° C. for eight hours and then cooled to room temperature. Thereafter, the resultant silica sol was removed from the autoclave. The silica sol was evaluated according to the aforementioned "evaluation of physical properties of silica sol" and "determination of deformation."

Example 4

A raw material liquid of Example 4 was produced in the same manner as in Example 1, except that 10% by mass nitric acid serving as an anion source was changed to 0.6 g of oxalic acid dihydrate, the amount of 28% aqueous ammonia solution was changed to 3.6 g, and the amount of pure water was changed to 14.4 g.

A SUS autoclave (inner volume: 300 ml) was charged with 260 g of the raw material liquid, and the raw material liquid was heated at 140° C. for eight hours and then cooled to room temperature. Thereafter, the resultant silica sol was removed from the autoclave. The silica sol was evaluated according to the aforementioned "evaluation of physical properties of silica sol" and "determination of deformation."

Example 5

A raw material liquid of Example 5 was produced in the same manner as in Example 1, except that 10% by mass nitric acid serving as an anion source was changed to 7.4 g of 8% by mass sulfuric acid, the amount of 28% by mass aqueous ammonia solution was changed to 5.4 g, and the amount of pure water was changed to 14.4 g.

A SUS autoclave (inner volume: 300 ml) was charged with 260 g of the raw material liquid, and the raw material liquid was heated at 140° C. for eight hours and then cooled to room temperature. Thereafter, the resultant silica sol was removed from the autoclave. The silica sol was evaluated according to the aforementioned "evaluation of physical properties of silica sol" and "determination of deformation."

Comparative Example 1

A raw material liquid of Comparative Example 1 was produced in the same manner as in Example 1, except that the amount of 10% by mass aqueous nitric acid solution was changed to 3.0 g, the amount of 28% by mass aqueous ammonia solution was changed to 3.9 g, and the amount of pure water was changed to 11.8 g.

A SUS autoclave (inner volume: 300 ml) was charged with 260 g of the raw material liquid, and the raw material liquid was heated at 140° C. for eight hours and then cooled to room temperature. Thereafter, the resultant silica sol was removed from the autoclave. The silica sol was evaluated according to the aforementioned "evaluation of physical properties of silica sol" and "determination of deformation."

Comparative Example 2

A raw material liquid of Comparative Example 2 was produced in the same manner as in Example 1, except that the amount of 10% by mass aqueous nitric acid solution was changed to 9.3 g, the amount of 28% by mass aqueous ammonia solution was changed to 4.9 g, and the amount of pure water was changed to 4.5 g.

A SUS autoclave (inner volume: 300 ml) was charged with 260 g of the raw material liquid, and the raw material liquid was heated at 140° C. for eight hours and then cooled to room temperature. The product removed from the autoclave was found to undergo gelation.

Tables 1 and 2 show the silica source, $SiO_2$ concentration, and pH of the colloidal aqueous solution of activated silica used for the production of each of the raw material liquids of Examples 1 to 5 and Comparative Examples 1 and 2, and the type and amount of an anion source added to the colloidal aqueous solution of activated silica.

Tables 3 and 4 show the physical properties and heating conditions of the raw material liquids prepared in Examples 1 to 5 and Comparative Examples 1 and 2.

Tables 5 to 7 show the results of evaluation of the physical properties and determination of deformation of the silica sols produced in Examples 1 to 5 and Comparative Example 1 and those of the gel produced in Comparative Example 2.

Tables 4 and 5 show the results of evaluation of the physical properties and determination of deformation of the silica sols produced in Examples 1 to 5 and Comparative Example 1.

FIGS. 1 to 6 are TEM (transmission electron microscope) photographs (magnification: 250,000) of colloidal silica particles contained in the silica sols produced in Examples 1 to 5 and Comparative Example 1, respectively.

TABLE 1

| (a) Raw material liquid | Example 1 | Example 2 | Example 3 | Example 4 |
|---|---|---|---|---|
| Silica source | Activated silica | Activated silica | Activated silica | Activated silica |
| $SiO_2$ concentration (wt %) | 3.4 | 3.4 | 3.4 | 3.4 |
| pH of activated silica | 2.9 | 2.9 | 2.9 | 2.9 |
| Anion source | Nitric acid | Nitric acid | Oxalic acid | Oxalic acid |
| Anion/silica (wt %) | 4.4 | 6.8 | 3.0 | 3.6 |

TABLE 2

| (a) Raw material liquid | Example 5 | Comparative Example 1 | Comparative Example 2 |
|---|---|---|---|
| Silica source | Activated silica | Activated silica | Activated silica |
| $SiO_2$ concentration (wt %) | 3.4 | 3.4 | 3.4 |
| pH of activated silica | 2.9 | 2.9 | 2.9 |
| Anion source | Sulfuric acid | Nitric acid | Nitric acid |
| Anion/silica (wt %) | 5.0 | 2.5 | 7.8 |

TABLE 3

| | Example 1 | Example 2 | Example 3 | Example 4 |
|---|---|---|---|---|
| (a) Physical properties of raw material liquid | | | | |
| pH | 9.61 | 9.61 | 9.64 | 9.60 |
| Electrical conductivity μS/cm | 4160 | 5740 | 4050 | 4380 |
| (b) Heating conditions | | | | |
| Temperature (° C.) | 140 | 140 | 140 | 140 |
| Time (hr) | 8 | 8 | 8 | 8 |

TABLE 4

| | Example 5 | Comparative Example 1 | Example 2 |
|---|---|---|---|
| (a) Physical properties of raw material liquid | | | |
| pH | 9.60 | 9.61 | 9.61 |
| Electrical conductivity μS/cm | 5150 | 3080 | 6820 |
| (b) Heating conditions | | | |
| Temperature (° C.) | 140 | 140 | 140 |
| Time (hr) | 8 | 8 | 8 |

TABLE 5

| | Example 1 |
|---|---|
| Physical properties of silica sol | |
| pH | 10.1 |
| Electrical conductivity μS/cm | 3490 |
| $D_L$ particle diameter (nm) | 37.4 |
| $D_B$ particle diameter (nm) | 12.3 |
| $D_L/D_B$ ratio | 3.0 |
| Deformation | ○ |
| Particle length (nm) by observation with electron microscope | 153 |
| $SiO_2$ % by mass | 3.2 |
| Na/$SiO_2$ (ppm) | 962 |
| K/$SiO_2$ (ppm) | 4 |
| Mg/$SiO_2$ (ppm) | 35 |
| Ca/$SiO_2$ (ppm) | 34 |

TABLE 6

| | Example 2 | Example 3 | Example 4 |
|---|---|---|---|
| Physical properties of silica sol | | | |
| pH | 10.1 | 10.1 | 10.0 |
| Electrical conductivity μS/cm | 5220 | 3420 | 3830 |
| $D_L$ particle diameter (nm) | 171.9 | 38.5 | 71.4 |
| $D_B$ particle diameter (nm) | 13.2 | 12.4 | 12.5 |
| $D_L/D_B$ ratio | 13.0 | 3.1 | 5.7 |
| Deformation | ○ | ○ | ○ |

TABLE 6-continued

|  | Example 2 | Example 3 | Example 4 |
|---|---|---|---|
| Particle length (nm) by observation | | | |
| with electron microscope | 743 | 543 | 494 |
| $SiO_2$ % by mass | 3.2 | 3.2 | 3.2 |

TABLE 7

|  | Example 5 | Comparative Example 1 | Comparative Example 2 |
|---|---|---|---|
| Physical properties of silica sol | | | |
| pH | 10.1 | 10.2 | Gelation |
| Electrical conductivity μS/cm | 4570 | 2360 | Gelation |
| $D_L$ particle diameter (nm) | 85.2 | 23.6 | Gelation |
| $D_B$ particle diameter (nm) | 13.9 | 11.6 | Gelation |
| $D_L/D_B$ ratio | 6.1 | 2.0 | Gelation |
| Deformation | ○ | X | Gelation |
| Particle length (nm) by observation | | | |
| with electron microscope | 514 | 46 | |
| $SiO_2$ % by mass | 3.2 | 3.2 | 3.2 |

INDUSTRIAL APPLICABILITY

A silica sol which contains a small amount of metal impurities and in which colloidal silica having an elongated particle shape is dispersed in a solvent can be readily produced by addition of a compound as an anion source and ammonia as an alkali source to an aqueous activated silica solution and heating of the resultant mixture at a predetermined temperature.

A silica sol containing non-spherical colloidal silica particles is expected to exhibit various effects (e.g., bonding force, adsorption force, and optical transparency) depending on the shape of the particles. Thus, the silica sol can be used in a variety of applications including microfillers for various coating agents, binders, modifiers, catalyst carriers, and abrasives for electronic materials (e.g., an abrasive for a silicon wafer, and a CMP abrasive for a device wafer for polishing a silicon oxide film or a metal such as copper or aluminum).

The invention claimed is:

1. A method for producing a silica sol containing elongated colloidal silica particles dispersed in a liquid medium and having an $SiO_2$ concentration of 6 to 30% by mass, wherein the elongated colloidal silica particles have a particle length of 50 to 1,000 nm as determined by observation with an electron microscope and exhibit a $D_L/D_B$ ratio of 2.5 or more and a $D_L$ of 30 to 300 nm wherein $D_L$ is an average particle diameter (nm) as measured by the dynamic light scattering method, and $D_B$ is a primary particle diameter (nm) as measured by the nitrogen gas adsorption method, the production method comprising the following steps (a) and (b):

(a) a step of preparing a raw material liquid by adding at least one compound as an anion source selected from the group consisting of inorganic acids, organic acids, and ammonium salts of these acids, and ammonia to a colloidal aqueous solution of activated silica having an $SiO_2$ concentration of 1 to 6% by mass and a pH of 2 to 5 so that the mass ratio of the compound to $SiO_2$ is 3.0 to 7.0%; and (b) a step of heating the raw material liquid prepared in the step (a) at 80 to 200° C. for 0.5 to 20 hours, to thereby produce a silica sol.

2. The method for producing a silica sol according to claim 1, wherein the colloidal aqueous solution of activated silica used in the step (a) is prepared by bringing an aqueous alkali silicate solution exhibiting a ratio by mole of $SiO_2$/$M_2O$ (wherein M is sodium or potassium) of 1 to 4.5 into contact with a strong acid-type cation exchange resin or with both a strong acid-type cation exchange resin and a strong base-type anion exchange resin.

3. The method for producing a silica sol according to claim 2, wherein the colloidal aqueous solution of activated silica used in the step (a) is prepared by treating the aqueous alkali silicate solution with a strong acid at a temperature of 1 to 98° C., and then bringing the treated aqueous solution into contact with the strong acid-type cation exchange resin or with both the strong acid-type cation exchange resin and the strong base-type anion exchange resin.

4. The method for producing a silica sol according to claim 2, wherein the colloidal aqueous solution of activated silica used in the step (a) is prepared by bringing the aqueous alkali silicate solution into contact with a carboxylic acid-type chelating resin, a hydroxyl group-type chelating resin, and/or an amine-type chelating resin before or after contact with the strong acid-type cation exchange resin or with both the strong acid-type cation exchange resin and the strong base-type anion exchange resin.

5. The method for producing a silica sol according to claim 1, wherein the compound as an anion source used in the step (a) is at least one compound selected from the group consisting of nitric acid, sulfuric acid, phosphoric acid, boric acid, hydrofluoric acid, hydrochloric acid, acetic acid, formic acid, oxalic acid, citric acid, lactic acid, malic acid, gluconic acid, tartaric acid, ethylenediaminetetraacetic acid (EDTA), diethylenetriaminepentaacetic acid (DTPA), and an ammonium salt of any of these.

6. The method for producing a silica sol according to claim 1, wherein the colloidal aqueous solution of activated silica used in the step (a) contains colloidal particles having an average particle diameter of less than 5 nm.

7. The method for producing a silica sol according to claim 1, wherein the ammonia added in the step (a) is in the form of ammonia gas or an aqueous ammonia solution.

8. The method for producing a silica sol according to claim 1, wherein the step (a) comprises a step of adding the compound as an anion source to the colloidal aqueous solution of activated silica, followed by addition of the ammonia.

9. The method for producing a silica sol according to claim 1, wherein the step (a) comprises a step of adding the ammonia to the colloidal aqueous solution of activated silica, followed by addition of the compound as an anion source and subsequent addition of the ammonia.

10. The method for producing a silica sol according to claim 1, wherein the raw material liquid prepared in the step (a) has a pH of 8 to 12.

11. The method for producing a silica sol according to claim 1, wherein, in the step (b), the raw material liquid is heated in an autoclave apparatus at 100° C. to 180° C.

12. The method for producing a silica sol according to claim 1, wherein the method further comprises a step of bringing the silica sol produced in the step (b) into contact with a strongly acidic ion exchange resin and/or a strongly basic ion exchange resin.

13. The method for producing a silica sol according to claim 12, wherein the method further comprises a step of bringing the silica sol produced in the step (b) into contact with a carboxylic acid-type chelating resin, a hydroxyl group-type chelating resin, and/or an amine-type chelating resin before or after contact with the strongly acidic ion exchange resin and/or the strongly basic ion exchange resin.

14. The method for producing a silica sol according to claim 1, wherein the method further comprises a step of replacing the aqueous medium of the produced silica sol with an organic medium.

15. The method for producing a silica sol according to claim 1, wherein the mass ratio of each of Ca and Mg to $SiO_2$ is 2 to 100 ppm in the silica sol.

16. The method for producing a silica sol according to claim 1, wherein the mass ratio of Na to $SiO_2$ is 2 to 1,000 ppm, and the mass ratio of K to $SiO_2$ is 2 to 100 ppm in the silica sol.

17. The method for producing a silica sol according to claim 1, wherein the elongated colloidal silica particles exhibit a $D_L/D_B$ ratio of 3 to 30 wherein $D_L$ is an average particle diameter (nm) as measured by the dynamic light scattering method, and $D_B$ is a primary particle diameter (nm) as measured by the nitrogen gas adsorption method.

18. The method for producing a silica sol according to claim 1, wherein the silica sol is an acidic silica sol or an ammonia-containing alkaline silica sol.

19. The method for producing a silica sol according to claim 3, wherein the colloidal aqueous solution of activated silica used in the step (a) is prepared by bringing the treated aqueous solution into contact with a carboxylic acid-type chelating resin, a hydroxyl group-type chelating resin, and/or an amine-type chelating resin before or after contact with the strong acid-type cation exchange resin or with both the strong acid-type cation exchange resin and the strong base-type anion exchange resin.

* * * * *